(12) United States Patent
Parry et al.

(10) Patent No.: US 7,755,784 B2
(45) Date of Patent: Jul. 13, 2010

(54) IMAGE FORMING DEVICES, IMAGING METHODS, AND METHODS OF MODIFYING A CONFIGURATION OF AN IMAGE FORMING DEVICE

(75) Inventors: Travis J. Parry, Boise, ID (US); Robert Sesek, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1961 days.

(21) Appl. No.: 10/260,827

(22) Filed: Sep. 27, 2002

(65) Prior Publication Data

US 2004/0061728 A1  Apr. 1, 2004

(51) Int. Cl.
*G06F 3/12* (2006.01)
*G06K 15/00* (2006.01)
(52) U.S. Cl. ..................................... 358/1.15; 358/1.13
(58) Field of Classification Search ................ 358/1.15, 358/1.16, 1.9, 1.18, 1.1, 1.13, 1.14; 710/8, 710/14, 15, 18; 713/100
See application file for complete search history.

(56) References Cited

U.S. PATENT DOCUMENTS

| | | | | |
|---|---|---|---|---|
| 5,138,377 | A * | 8/1992 | Smith et al. ................... | 399/11 |
| 5,414,494 | A * | 5/1995 | Aikens et al. .................. | 399/1 |
| 5,537,626 | A * | 7/1996 | Kraslavsky et al. ............ | 710/8 |
| 5,694,618 | A * | 12/1997 | Hibino ......................... | 710/46 |
| 5,956,487 | A | 9/1999 | Venkatraman et al. | |
| 6,041,165 | A * | 3/2000 | Morikawa .................... | 358/1.2 |
| 6,176,575 | B1 | 1/2001 | Crawford et al. | |
| 6,317,848 | B1 | 11/2001 | Sorens et al. | |
| 6,938,202 | B1 * | 8/2005 | Matsubayashi et al. .. | 715/501.1 |
| 6,971,732 | B1 * | 12/2005 | Seshimo et al. ............... | 347/19 |

OTHER PUBLICATIONS

Office World News, "i-copiers and i-printers give dealers the right connections" Ft. Lauderdale: Oct. 2000. vol. 28, Issue 10; p. 30 (2 pages).*
U.S. Patent Application Publication No. US 2001/0035972 A1; David K. Wurmfeld; Publication Date: Nov. 1, 2001.
"Test Software and Study Reports"; Spencer and Associates; www.spencer.com/TestReports.html; Sep. 27, 2002; 2 pps.
"The Color Hardcopy Quality Factors (CHQ) IV Test File Suite"; Spencer and Associates; www.spencer.com/CHQFfiles.html; Sep. 27, 2002; 2 pps.
"The Color Hardcopy Quality Enhancement Test File Suite"; Spencer and Associates; www.spencer.com/CQEfiles.html; Sep. 27, 2002; 1 p.

* cited by examiner

*Primary Examiner*—Dov Popovici
*Assistant Examiner*—Thomas J Lett (57) ABSTRACT

Image forming devices, imaging methods, and methods of modifying a configuration of an image forming device are described. According to one aspect, an image forming device includes an interface adapted to communicate with a remote device via a communication medium, and processing circuitry configured to access first configuration data to control an operation of the image forming device according to a first configuration to form hard images upon media during a first period of time, to monitor the formation of hard images upon the media during the first period of time, to control the interface to communicate usage data corresponding to the monitoring, and to access second configuration data received from the remote device responsive to the communication of the usage data, wherein the processing circuitry is configured to access the second configuration data to control the operation of the image forming device according to a second configuration different than the first configuration to form the hard images upon the media during a second period of time after the first period of time.

55 Claims, 5 Drawing Sheets

IMAGE FORMING DEVICES, IMAGING METHODS, AND METHODS OF MODIFYING A CONFIGURATION OF AN IMAGE FORMING DEVICE

FIELD OF THE INVENTION

The invention relates to image forming devices, imaging methods, and methods of modifying a configuration of an image forming device.

BACKGROUND OF THE INVENTION

Imaging devices, such as laser printers, ink printers, etc. are utilized in numerous home and office applications. The increasing sophistication of both imaging devices and personal computers generally has resulted in heightened reliance upon fast and proper operation of the imaging devices in everyday home and work environments. For example, modern host devices provide faster processing and increased storage of data compared with devices of a few years ago, while imaging devices coupled with host devices have experienced significant advancements in reproduction, resolution and other attributes.

Numerous variables, features, and design options exist which may be incorporated into imaging devices. As part of the engineering, design and fabrication of imaging devices, it may be determined that a particular configuration of such variables, features and design options is best suited for the largest percentage of users. Accordingly, such approaches attempt to satisfy the largest group of users.

The described design approaches have drawbacks. For example, an imaging device may be configured to accommodate a particular special type of a print job at the sacrifice of being able to accommodate more common print jobs with increased performance, such as rasterization speed or imaging speed. A particular user may never image the special type of print job, however, the imaging device has already been configured or programmed to accommodate the special type of job with the associated drawback in degradation of performance with respect to imaging of more common jobs.

Aspects of the invention provide improved image forming devices and methods for alleviating problems associated with some design configurations. Additional aspects of the invention include remote devices and methods for communicating with the image forming devices.

DESCRIPTION OF THE DRAWINGS

FIG. 7 is a flow chart depicting exemplary operations of an image forming device.

FIG. 8 is a flow chart depicting exemplary operations of a remote device.

DETAILED DESCRIPTION OF THE INVENTION

According to one aspect, an image forming device comprises an interface adapted to communicate with a remote device via a communication medium, and processing circuitry configured to access first configuration data to control an operation of the image forming device according to a first configuration to form hard images upon media during a first period of time, to monitor the formation of hard images upon the media during the first period of time, to control the interface to communicate usage data corresponding to the monitoring, and to access second configuration data received from the remote device responsive to the communication of the usage data, wherein the processing circuitry is configured to access the second configuration data to control the operation of the image forming device according to a second configuration different than the first configuration to form the hard images upon the media during a second period of time after the first period of time.

According to another aspect, an image forming device comprises imaging means for imaging a plurality of hard images and initially configured according to a first configuration, processing means for obtaining usage data regarding operations of the imaging means, communication means for communicating the usage data and receiving updated configuration data responsive to the communication of the usage data, and configuration means for configuring the imaging means according to a second configuration different than the first configuration using the updated configuration data received from the remote device.

According to an additional aspect, an imaging method comprises providing an image forming device initially configured to form hard images according to an initial configuration, first forming a plurality of hard images upon media using the image forming device having the initial configuration, obtaining usage data regarding the formation of the hard images responsive to the first forming, communicating the usage data, receiving updated configuration data responsive to the communicating the usage data, subsequently configuring the image forming device to form the hard images upon the media according to the updated configuration data, and second forming the hard images upon the media using the image forming device having the subsequent configuration.

According to yet another aspect, a method of modifying a configuration of an image forming device comprises providing a plurality of different configuration data updates configured to cause processing circuitry of an image forming device to control an operation of the image forming device according to a plurality of respective different configurations, receiving usage data regarding the formation of hard images using the image forming device during a first period of time, and the image forming device having initial configuration data configured to cause the processing circuitry of the image forming device to control the operation of the image forming device according to a first configuration different than the respective different configurations during the first period of time, selecting one of the configuration data updates responsive to providing the usage data, and communicating the selected configuration data update to the image forming device.

Figure 1:
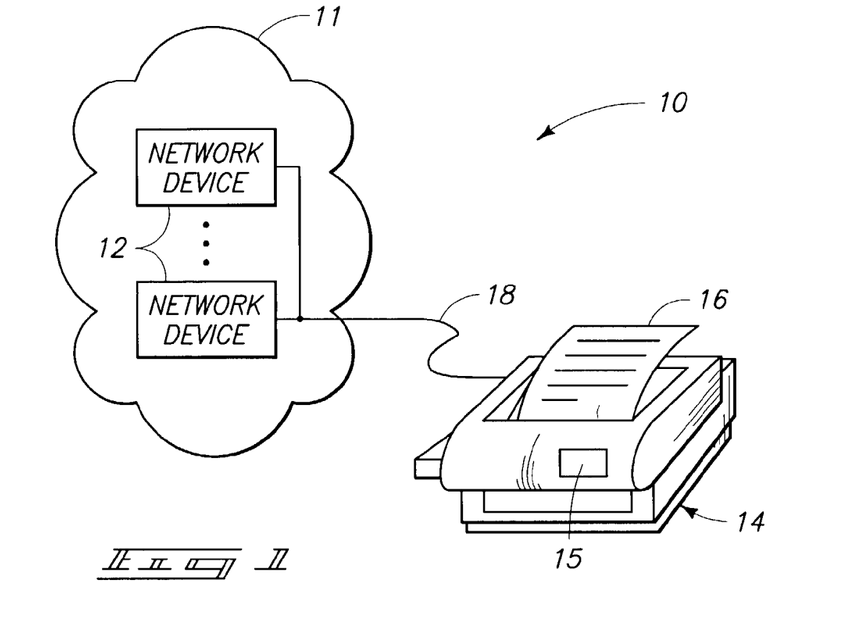
FIG. 1 is an illustrative representation of an exemplary image forming system.

FIG. 1 depicts an image forming system 10 including a network 11 comprising a plurality of network devices 12 coupled with an image forming device 14. Network 11 may be implemented in a private network arrangement (such as an intranet), public network arrangement (such as the Internet), a combination of private and public devices, or other configurations capable of communicating digital information.

Network devices 12 are operable to communicate with one another and with image forming device 14 in the described embodiment. Exemplary network devices 12 include personal computers, host devices, workstations, servers, routers, other image forming devices, and other devices capable of communicating digital information. An exemplary image forming device 14 includes a printer, facsimile device, copier, multiple-function device, or other device capable of forming hard images upon media 16 comprising paper, labels, transparencies, roll media, etc. Hard images include images physically rendered upon physical media 16. The illustrated image forming device 14 includes a display 15 arranged to indicate status, alarm conditions, consumable status and other conditions of image forming device 14. The depicted image forming device 14 may also be referred to as a network device 12 inasmuch as image forming device 14 communicates with network 11 and network devices 12 thereof.

Network device 12 and image forming device 14 are coupled via an appropriate communication medium 18. Medium 18 is arranged to communicate data according to a TCP/IP protocol in one arrangement. Exemplary communications intermediate devices 12, 14 described herein may be implemented using HTTP, HTTPS, FTP, or other protocols. In an exemplary network arrangement, medium 18 is coupled with respective network interface cards of network devices 12 and image forming device 14. Medium 18 implements bidirectional communications between one or more network device 12 and image forming device 14.

Figure 2:
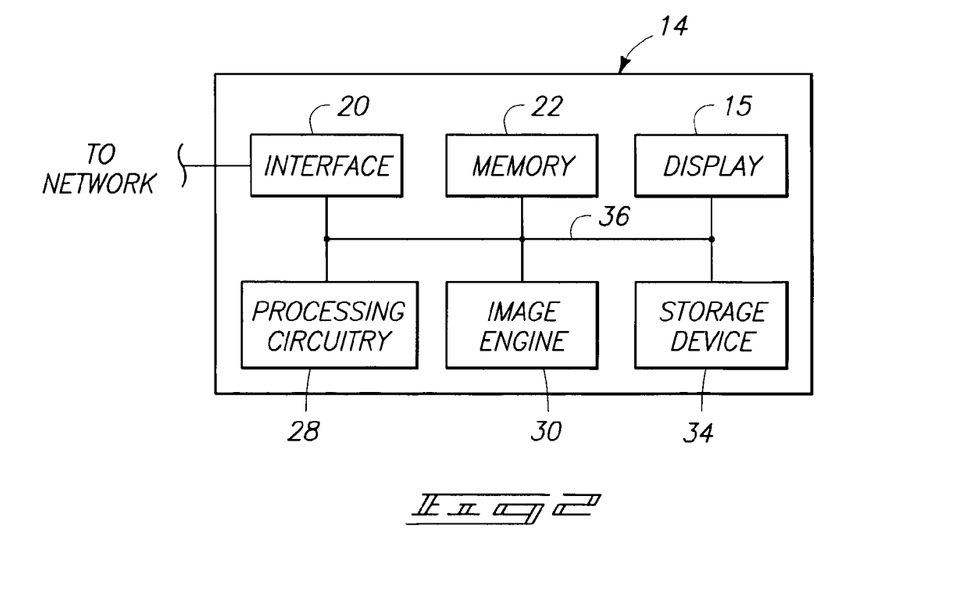
FIG. 2 is a functional block diagram of an exemplary image forming device of the depicted system of FIG. 1.

Referring to FIG. 2, an exemplary configuration of image forming device 14 includes display 15, an interface 20, a memory 22, processing circuitry 28, an image engine 30 and a storage device 34. A bus 36 is implemented to provide communications between components of image forming device 14. Some of the depicted components are optional and other arrangements of image forming device 14 configured to form hard images are possible. The exemplary embodiment herein will be discussed with reference to a printer application although the present invention applies to other image forming device configurations capable of forming hard images as mentioned above.

Interface 20 is configured to couple with medium 18 and to implement input/output communications between network devices 12 and image forming device 14. Interface 20 may be implemented in different configurations depending upon the application of image forming device 14. Interface 20 comprises a network interface card (NIC) in one embodiment.

Memory 22 stores digital information and instructions. For example, memory 22 is configured to store received application data and image data. In addition, memory 22 may store usage data, parameters, variables, executable code, and/or other digital data. Memory 22 comprises random access memory, read only memory, and/or flash memory in one example.

Application data includes data received from a host device and prepared by the host using an application program. Exemplary application programs include Word™ available from Microsoft Corp., WordPerfect™ available from Corel Corporation, Excel™ available from Microsoft Corp, and Acrobat Reader™ available from Adobe Systems Inc. The application data may be provided in files having respective formats according to the application programs, and include, for example, .doc files, .wpd files, .xls files and .pdf files. Other application programs exist and may be utilized to forward application data to image forming device 14.

In the described embodiment, memory 22 includes executable code to configure processing circuitry 28 as an embedded web server (EWS) which communicates with devices 12 of network 11. Embedded web server concepts are described in a U.S. Pat. No. 5,956,487, incorporated herein by reference. Such functionality enables processing circuitry 28 to communicate with network devices 12 of network 11, to forward data to devices 12, to receive communications from devices 12, to serve up web pages, etc.

Processing circuitry 28 may be implemented as a microprocessor arranged to execute executable code or programs to control operations of image forming device 14. For example, processing circuitry 28 may execute executable instructions stored within memory 22 or within storage device 34 and embodied as, for example, software and/or firmware instructions.

Processing circuitry 28 controls image engine 30 to implement imaging operations. Processing circuitry 28 may also be arranged to provide rasterization, manipulation, or processing of received data to be imaged. If received data to be imaged is embodied as application data (e.g., .doc file, .wpd file, .xls file, .pdf, etc.), processing circuitry 28 may convert the application data to image data to be imaged using the image engine in, for example, a driverless printing environment. Exemplary image data-includes page description language (PDL) data, such as Printer Command Language (PCL) data and Postscript data.

Image engine 30 uses consumables to implement the formation of hard images. In the described embodiment, image engine 30 forms images upon media 16. An exemplary engine 30 is a print engine including a developing assembly and a fusing assembly (not shown) to respectively form images using developing material, such as toner, and to affix the developing material to media 16 responsive to control from processing circuitry 28. Image engine 30 comprising a print engine is operable to print hard images upon media 16. Other constructions or embodiments of image engine 30 are possible.

Figure 3:
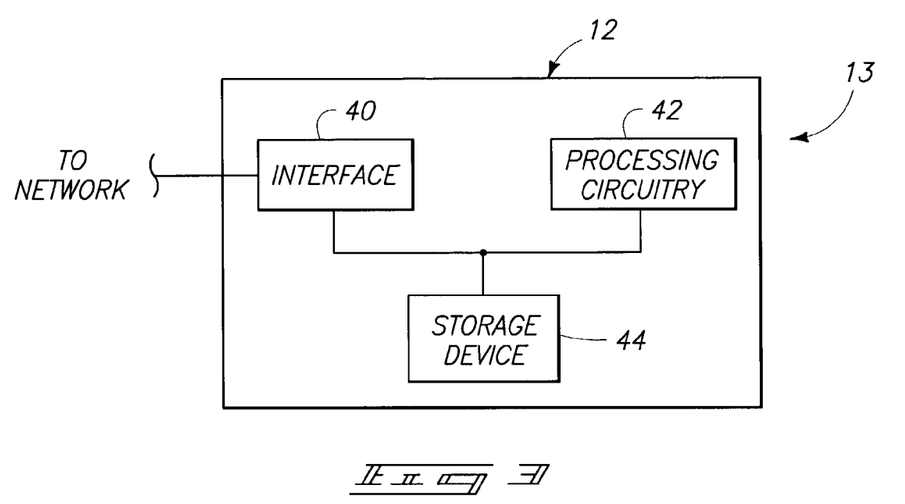
FIG. 3 is a functional block diagram of an exemplary remote device of the system of FIG. 1.

FIG. 3 depicts an exemplary configuration of a network device 12 associated with a manufacturer, supplier, reseller, or other entity associated with image forming device 14 and referred to as a remote device 13. The illustrated exemplary remote device 13 includes an interface 40, processing circuitry 42, and a storage device 44 and may be embodied as a server in one exemplary configuration.

Interface 40 implements bidirectional communications with respect to medium 18. Interface 40 may be arranged as a network interface card in an exemplary configuration. Processing circuitry 42 may comprise a microprocessor configured to execute code or programs. Storage device 44 may be implemented as a hard disk, memory and/or other configuration capable of storing data and executable code.

As described further below, image forming device 14 is arranged to communicate usage data to remote device 13 which is arranged to facilitate modifications or upgrades for image forming device 14 according to aspects of the invention. As described below, exemplary aspects provide the modifications or upgrades responsive to usage data compiled during imaging operations of image forming device 14.

Initially, an image forming device 14 may be shipped from a manufacturer or otherwise provided at an initial moment in time in a first configuration to accommodate numerous types of image jobs (e.g., graphics, text, combined text and graphics, etc.) according to a predetermined usage profile, for example, arranged by the manufacturer. As mentioned above, accommodating numerous types of image jobs within an image forming device 14 may result in degraded performance for specific types of imaging which would otherwise experience enhanced operations if the image forming device 14 was tailored to such imaging. One example of operations of image forming device 14 which may be tailored or varied include starting imaging before an entire page is rasterized versus waiting to rasterize the entire page before imaging. These operations include respective advantages relative to the other (e.g., printing speed versus guaranteeing an ability to image all pages). Another example is limiting the printing of e-mail messages to draft mode to ensure a lower cost per page. These described operations are exemplary and other operations may be tailored in other arrangements.

Image forming device 14 may include initial configuration data, such as initial executable code and/or initial parameters or variables, within memory 22 and/or storage device 34 according to the first configuration to accommodate numerous generic types of imaging. Imaging via image forming device 14 using the initial executable code and/or initial parameters may be referred to as imaging during a first period of time according to the first configuration of device 14. Such imaging may be utilized to tailor or modify the configuration of image forming device 14 according to aspects of the invention as described below.

Some aspects provide monitoring of the imaging of jobs using the image forming device 14 during the first period of time. For example, processing circuitry 28, or an external device such as a printer server, monitors imaging of the image forming device 14 during the first period of time wherein the processing circuitry 28 utilizes the initial configuration data to implement imaging operations. The monitoring may include monitoring of one or more operation, parameter, performance or other aspect of imaging using image forming device 14. For example, the number of unique users accessing the image forming device, the average size of jobs received and processed (e.g., number of pages, number of pixels, file size (MBs), application data file type (.doc, .wpd, .xls, .pdf, etc.), number of each job, file processing time, and imaging or print time. The monitoring provides usage data indicating imaging operations over the first period of time for the image forming device 14. The usage data may be stored within storage device 34 and/or memory 22.

Processing circuitry 28 may monitor the application data file types in one exemplary arrangement using Printer Job Language (PJL) headers of received jobs. A host may provide document type tags within PJL headers for the jobs which are extracted by the processing circuitry 28 to identify the respective application data types. In alternative systems (e.g., driverless printing environments), the actual application data files are sent to the image informing device 14 which provides appropriate conversion of the application data to image data (e.g., PDL format data) which is subsequently imaged.

Processing circuitry 28 may determine average job performance of image forming device 14 using the above exemplary or other information. The average job performance is useful to determine imaging performance in the actual environment of the user.

In addition, monitored and stored usage data may be associated with date and time information corresponding to the image jobs. For example, date and time information that jobs are received and processed may be monitored and also stored with the usage data to provide usage profiles for the particular image forming device 14. Storage of this information permits evaluation of average performance. Usage data may be conveyed in a variety of formats. For example, the usage data may be depicted by specific user, by all users, by file size, by processing time, by calculated page per minute information, by day of the week, by time of day, etc. Consumable consumption during imaging operations may be monitored and provided within usage data. Monitoring and compiling of the usage data allows a user entity, such as a system administrator or other entity, to evaluate average performance for specific users, specific job types, or specific times of the day in the user's actual environment.

Figure 4:
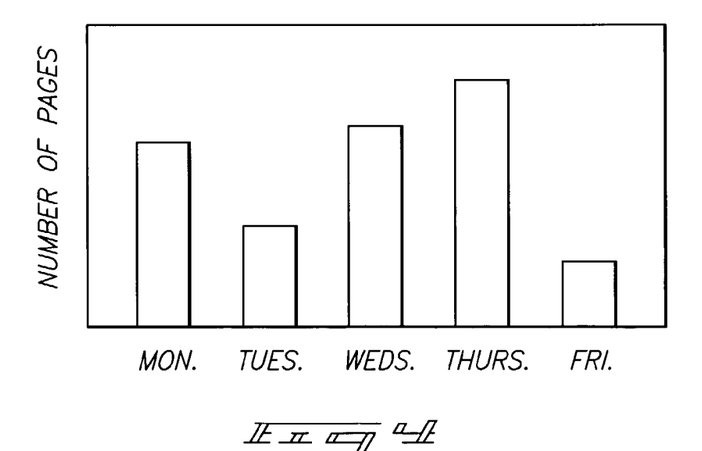
FIG. 4 is an illustrative representation of an exemplary histogram depicting usage of an image forming device.
Figure 5:
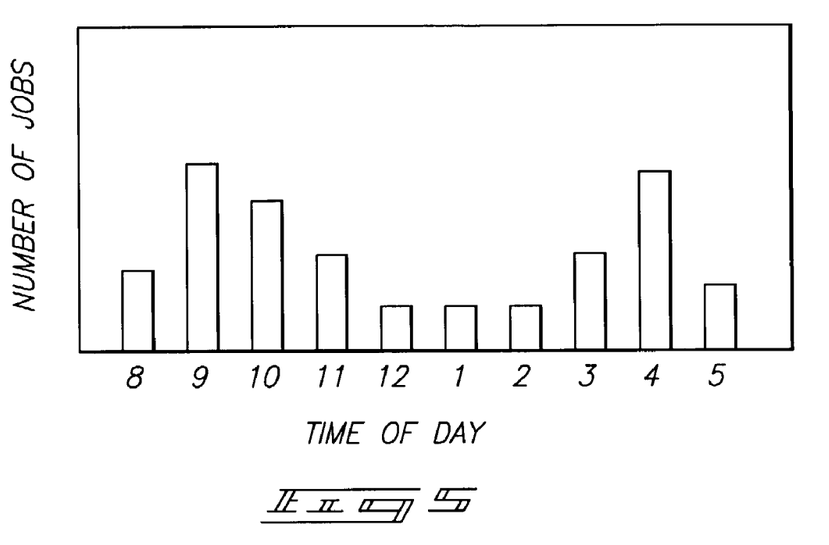
FIG. 5 is an illustrative representation of another exemplary histogram depicting usage of an image forming device.
Figure 6:
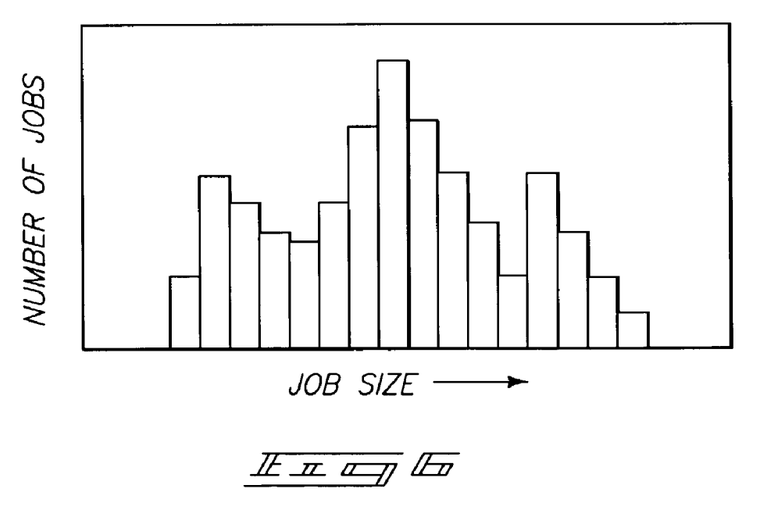
FIG. 6 is an illustrative representation of yet another exemplary histogram depicting usage of an image forming device.

Referring to FIGS. 4-6, exemplary formats for depicting usage data, including usage profiles, are shown. The usage data is depicted as histograms in the exemplary formats. FIG. 4 illustrates number of pages imaged by image forming device 14 with respect to days of the week. FIG. 5 illustrates number of jobs imaged by image forming device 14 with respect to time of the day. FIG. 6 illustrates number of jobs imaged by image forming device 14 with respect to job size (which may be conveyed as number of pages or pixels, or the size of the respective files in exemplary arrangements).

The usage data may be provided to the user entity which can monitor use of one or more image forming device 14 by specific users, job attributes, etc. For example, processing circuitry 28 arranged as an embedded web server may forward compiled usage data in an appropriate communication via network 11 to a network device 12 arranged as a host and associated with the user entity.

According to additional aspects of the invention, the usage data may be communicated via the processing circuitry 28 to a network device 12 or other device configured as a remote device 13 of the manufacturer, reseller, help entity or other entity associated with the image forming device 14. In one arrangement, processing circuitry 28 provides the compiled usage data into a proper message format for communication to remote device 13 and controls interface 20 to communicate the message including the usage data to remote device 13. The communicated usage data may include a usage profile of image forming device 14 during the first period of time. In one aspect, processing circuitry 28 provides automatic communication of the usage data without user input, for example, after a period of time of use of device 14 or after sufficient usage data has been compiled.

Remote device 13 is arranged to receive communicated messages from one or more image forming device 14 and including respective usage data. Remote device 13 communicates updated configuration data operable to reconfigure operations of image forming device 14 responsive to the receipt of the usage data. Remote device 13 is arranged in one embodiment to store plural different updated configuration data (also referred to as configuration data updates) corresponding to respective imaging operations of device 14. Exemplary updated configuration data includes executable code updates, such as firmware or software, within storage device 44. Alternative or additional updated configuration data includes updated parameter and/or variable values accessed by processing circuitry 28 or other circuitry to control operations of image forming device 14.

The executable code updates, updated parameters or other updated configuration data reconfigures device 14 by controlling processing circuitry 28 or other circuitry to control respective operations of the image forming device 14 according to a plurality of possible configurations. For example, one update of configuration data may be specifically tailored to provide optimum performance of image forming device 14 with respect to the formation of graphical images while a second update of configuration data may be tailored to provide optimum performance of device 14 with respect to other images, such as primarily text images.

In one embodiment, processing circuitry 42 of device 13 analyzes received compiled usage data from image forming device 14 and selects the appropriate updated configuration data based upon and tailored to the compiled usage data. For example, if the usage data indicates a majority of graphical images have been imaged using device 14, processing circuitry 42 may select appropriate updated configuration data tailored to the generation of graphical images. If the usage data indicates a majority of images result from a specific type of application data (e.g., spreadsheet images), the processing circuitry 42 may select different updated configuration data corresponding to the usage data.

Following selection of the appropriate updated configuration data, processing circuitry 42 may encapsulate the updated configuration data within a message for communication to the device 14 using network 11. For example, the updated configuration data may be provided within a message for communication to device 14. If no appropriate updated configuration data is found, remote device 13 may send a response to device 14 requesting additional usage data or other information.

Image forming device 14 monitors for the reception of messages from remote device 13 including the updated configuration data. Upon receipt, processing circuitry 28 extracts the updated configuration data and initiates a reconfiguration operation. For example, the processing circuitry 28 may store the updated configuration data comprising executable code and/or parameters in one example within memory 22 and/or storage device 34 to reconfigure device 14.

Following the reconfiguration of device 14, imaging operations may be referred to as being performed during a second or subsequent period of time. During the second period of time, processing circuitry 28 is configured to access the received updated configuration data to implement at least some imaging operations according to a second configuration different than the first or initial configuration corresponding to the first period of time. The reconfigured device 14 may be arranged to process and image jobs in a more efficient manner and with improved performance compared with the processing and imaging of such jobs using the initially configured device 14 and based upon the compiled usage data.

Accordingly, in some aspects of the invention, processing circuitry 28 of image forming device 14 executes initial executable code, accesses initial parameters, and/or accesses other initial configuration data at an initial moment in time to implement imaging operations according to a first configuration tailored to a default or predetermined usage profile, wherein for example, numerous types of different jobs are accommodated, processed and imaged as indicated above. Following compilation and communication of usage data during the first period of time, the processing circuitry 28 accesses executable code updates, parameter updates, or other updated configuration data received from remote device 13 to control operations of the image forming device 14 according to a second configuration tailored to a different usage profile which may correspond to the communicated usage data. Additional aspects including operations of remote device 13 are also provided as mentioned above.

Alternatively, or in addition to communication of updated configuration data, remote device 13 may communicate informational suggestion messages to image forming device 14 responsive to analysis of the communicated usage data. The suggestion messages communicated to device 14 may include text to be imaged using image forming device 14 and/or communicated from device 14 in other formats, such as an email message, to a user entity, for example. An exemplary message communicated by remote device 13 could assist a user entity with formatting of jobs to be imaged to provide improved imaging operations using device 14. An exemplary message is "If you are going to send numerous PDF files to this particular image forming device, you may see improved results by sending them in Postscript versus PCL."

Referring to FIG. 7, an exemplary operational method executable by processing circuitry 28 of image forming device 14 to implement aspects of the invention is illustrated. The depicted methodology may be embodied as executable code within memory 22 and/or storage device 34 and executed by processing circuitry 28. The methodology is presented to illustrate exemplary steps for performing aspects of the invention. Other methods are possible including more, less or alternative steps.

At a step S10, the processing circuitry is arranged to control operations of the image forming device to form hard images.

At a step S12, the processing circuitry is arranged to monitor operations of the image forming device during the formation of the hard images At a step S14, the processing circuitry is arranged to store usage data within the memory and/or storage device and responsive to the monitoring.

At a step S16, it is determined whether sufficient usage data has been compiled for use by a remote device 13.

The methodology loops to step S10 if the condition of step S16 is negative.

If the condition of step S16 is affirmative, the processing circuitry proceeds to a step S18 to generate a usage profile based upon the compiled usage data during the formation of the hard images.

At a step S20, the processing circuitry communicates the usage profile to the remote device 13. Alternatively, the processing circuitry may merely compile and communicate the usage data within a raw data form or provided in another desired format.

At a step S22, the processing circuitry monitors for the reception of updated configuration data from the remote device responsive to the communication of the usage profile.

If the condition of step S22 is negative, the processing circuitry proceeds to a step S24 to determine if a timeout has occurred or other response has been received.

The processing circuitry proceeds to step S10 if the condition of step S24 is affirmative.

If the condition of step S24 is negative, the processing circuitry proceeds to step S22 to again monitor for the reception of the updated configuration data.

If the condition of step S22 is affirmative, the processing circuitry proceeds to a step S26 to implement reconfiguration operations and to update the configuration of device 14 including storage of the received updated configuration data for access in performing future imaging operations.

Thereafter, the processing circuitry may loop back to step S10 to again form hard images according to the updated configuration data.

Referring to FIG. 8, an exemplary operational method executable by processing circuitry 42 of remote device 13 to implement aspects of the invention is illustrated. The depicted methodology may be embodied as executable code within storage device 44 and executed by processing circuitry 42. The methodology is presented to illustrate exemplary steps for performing aspects of the invention. Other methods are possible including more, less or alternative steps.

At an initial step S30, the processing circuitry receives the usage profile communicated by the image forming device in step S20.

At a step S32, the processing circuitry searches a plurality of configuration data updates using the received usage profile. The updates include executable code and/or parameters for reconfiguring the image forming device which communicated the usage profile in one example.

At a step S34, it is determined whether appropriate updated configuration data has been located in step S32.

If the condition of step S34 is affirmative, the processing circuitry proceeds to a step S36 to communicate the updated configuration data to the image forming device which communicated the usage profile.

If the condition of step S34 is negative, the processing circuitry communicates a response indicating no configuration data has been located to the image forming device which communicated the usage profile in a step S38.

Following the execution of step S36 or step S38, the processing circuitry can again monitor for the reception of another usage profile from the same or different image forming device and repeat the depicted methodology if appropriate.

Some research entities, such as Hardcopy Observer, provide monitoring of performance of printers. Individuals of the entities may test printer performance using a suite of tests and manually record the resulting information. The information may be fed back into a host computer and stored therein. Typically, the information is used to evaluate performance of the printer and to verify that the printer performance meets manufacturer claims. Aspects of the invention provide further operations including modification of image forming devices 14 responsive to usage data, and enabling image forming devices 14 to be tailored to their specific environment following usage for a predetermined amount of time.

The protection sought is not to be limited to the disclosed embodiments, which are given by way of example only, but instead is to be limited only by the scope of the appended claims.

What is claimed is:

1. An image forming device comprising:
   an interface configured to communicate with a remote device via a communication medium; and
   processing circuitry configured to access first configuration data to control an operation of the image forming device according to a first configuration to form hard images upon media during a first period of time, to monitor the formation of hard images upon the media during the first period of time, to control the interface to communicate usage data corresponding to the monitoring, and to access second configuration data received from the remote device as a result of the communication of the usage data, wherein the processing circuitry is configured to access the second configuration data to control the operation of the image forming device according to a second configuration different than the first configuration to form the hard images upon the media during a second period of time after the first period of time, and wherein the second configuration data is tailored to a type of usage of the image forming device occurring during the first period of time as indicated by the usage data.

2. The device of claim 1 wherein the processing circuitry is configured to provide automatic communication of the usage data in an absence of user input requesting communication of the usage data.

3. The device of claim 1 wherein the interface is configured to receive application data generated using a plurality of application programs, the processing circuitry is configured to convert the application data into image data, an image engine is configured to form the hard images using the image data, and the processing circuitry is configured to monitor the application data to identify the corresponding application programs to monitor the formation of hard images, and wherein the usage data identifies the application programs providing the application data.

4. The device of claim 1 wherein the usage data comprises data regarding performance of the image forming device during the formation of hard images during the first period of time.

5. The device of claim 1 wherein the usage data comprises data regarding usage of a consumable of the image forming device during the formation of hard images during the first period of time.

6. The device of claim 1 wherein the processing circuitry is configured to control storage of the usage data during the first period of time.

7. The device of claim 1 further comprising a memory configured to receive and to store the second configuration data, and the processing circuitry is configured to access the second configuration data from the memory.

8. The device of claim 1 wherein the interface is configured to receive a suggestion message to provide improved operations of the image forming device as a result of the communication of the usage data, and the processing circuitry is configured to communicate the suggestion message to a user entity of the device.

9. The device of claim 1 wherein the processing circuitry is configured to control the interface to communicate the usage data to a user entity of the device.

10. The device of claim 1 wherein the first and the second configuration data comprise executable code.

11. The device of claim 1 wherein the second configuration data changes, compared with the first configuration, the operation performed by the image forming device with respect to printing of images upon paper by the image forming device.

12. The device of claim 1 wherein the interface is configured to receive a suggestion message from a remote device external of the image forming device as a result of the communication of the usage data externally of the image forming device, and the processing circuitry is configured to print the suggestion message upon paper to communicate the suggestion message.

13. The device of claim 1 wherein the second configuration data corresponds to usage indicated by the usage data with respect to the formation of the hard images during the first period of time, and the processing circuitry is configured to control the operation of the image forming device according to the second configuration data in accordance with the usage indicated by the usage data.

14. The device of claim 1 wherein the processing circuitry is configured to control the interface to communicate the usage data in the absence of a request for the usage data from external of the image forming device.

15. The device of claim 1 wherein the second configuration data is configured to configure the image forming device operating in the second configuration to form the hard images during the second period of time in accordance with usage of the image forming device to form the hard images during the first period of time as indicated by the usage data.

16. The device of claim 1 wherein the second configuration data is in accordance with one of a plurality of different predetermined types of usage of the image forming device.

17. The device of claim 2 wherein the processing circuitry is configured to access the second configuration data to control the operation of the image forming device according to the second configuration automatically in the absence of user input requesting the accessing of the second configuration data to control the operation of the image forming device according to the second configuration.

18. The device of claim 8 wherein the processing circuitry is configured to control an image engine to formulate the suggestion message comprising a hard image.

19. The device of claim 11 wherein the second configuration data changes the operation with respect to timing of imaging of a page with respect to rasterization of the page.

20. The device of claim 11 wherein the second configuration data changes the operation with respect to limiting printing of a given type of page to a predefined printing mode.

21. The device of claim 11 wherein the second configuration data changes print quality of pages printed by the image forming device according to the second configuration compared with print quality of pages printed by the image forming device according to the first configuration.

22. An image forming device comprising:
   imaging means for imaging a plurality of hard images and initially configured according to a first configuration;
   processing means for obtaining usage data regarding operations of the imaging means;
   communication means for communicating the usage data and receiving updated configuration data as a result of the communication of the usage data; and
   configuration means for configuring the imaging means according to a second configuration, different than the first configuration, using the updated configuration data; and
   wherein the communication means comprises means for automatically communicating the usage data and for automatically receiving the updated configuration data in an absence of user input requesting the communicating of the usage data or the receiving of the updated configuration data, and wherein the configuration means comprises means for automatically configuring the imaging means using the updated configuration data in an absence of user input requesting the configuring of the imaging means.

23. The device of claim 22 wherein the updated configuration data is tailored to a type of usage of the image forming device as indicated by the usage data.

24. The device of claim 22 wherein the configuration means comprises memory means for storing the updated configuration data for access by the processing means.

25. The device of claim 22 wherein the imaging means comprises printer means for printing the hard images upon media.

26. The device of claim 22 wherein the communication means comprises means for receiving a suggestion message and the imaging means comprises means for imaging the suggestion message.

27. The device of claim 22 wherein the communication means comprises means for receiving the updated configuration data comprising executable code.

28. The device of claim 22 wherein the imaging means comprises means initially configured to image the hard images upon media according to the first configuration, the processing means comprises means for obtaining the usage data during the imaging of the hard images, and the configuration means comprises means for configuring the imaging means to image the hard images according to the second configuration in accordance with a type of usage of the image forming device as indicated by the usage data.

29. An imaging method comprising:
   providing an image forming device initially configured to form hard images according to an initial configuration;
   first forming a plurality of hard images upon media using the image forming device having the initial configuration;
   obtaining usage data regarding the formation of the hard images as a result of the first forming;
   communicating the usage data;
   receiving updated configuration data as a result of the communicating the usage data, wherein the updated configuration data corresponds to a type of usage indicated by the usage data with respect to the formation of the hard images;
   subsequently configuring the image forming device to form the hard images upon the media according to the updated configuration data in accordance with the type of usage indicated by the usage data; and
   second forming the hard images upon the media using the image forming device having the subsequent configuration.

30. The method of claim 29 wherein the receiving comprises receiving the updated configuration data tailored to the usage data.

31. The method of claim 29 wherein the receiving comprises receiving the updated configuration data comprising configuration data tailored to the usage data, and the subsequently configuring comprises storing the updated configuration data for usage by processing circuitry of the image forming device.

32. The method of claim 29 wherein the communicating comprises automatically communicating the usage data in an absence of user input requesting the communicating.

33. The method of claim 29 further comprising providing application data for the hard images, and wherein the obtaining usage data comprises identifying a plurality of application programs utilized to provide the application data.

34. The method of claim 29 wherein the first and the second formings comprise printing the hard images.

35. The method of claim 29 wherein the receiving the updated configuration data comprises receiving executable code.

36. The method of claim 29 further comprising:
   receiving a suggestion message as a result of the communicating the usage data; and forming a hard image including the suggestion message.

37. The method of claim 29 further comprising communicating the usage data to a user entity.

38. The method of claim 29 wherein the communicating comprises communicating externally from the image forming device.

39. The method of claim 29 wherein the communicating comprises communicating in the absence of a request for the usage data from external of the image forming device.

40. The method of claim 29 wherein the obtaining, the communicating, the receiving, and the configuring individually comprise acts performed using the image forming device.

41. The method of claim 32 wherein the receiving and configuring comprise receiving and configuring in an absence of user input requesting the receiving or the configuring.

42. A method of modifying a configuration of an image forming device comprising:
   using circuitry of a remote device, providing a plurality of predetermined different configuration data updates configured to cause processing circuitry of an image forming device to control an operation of the image forming device according to a plurality of respective different configurations, each predetermined different configuration data update corresponding to a different imaging operation of the image forming device and including a plurality of parameter settings;
   using circuitry of the remote device, receiving usage data regarding the formation of hard images using the image forming device during a first period of time, the image forming device having initial configuration data configured to cause the processing circuitry of the image forming device to control the operation of the image forming device according to a first configuration different than the respective different configurations during the first period of time;

using circuitry of the remote device, selecting one of the different configuration data updates using the usage data; and using circuitry of the remote device, communicating the selected configuration data update to the image forming device.

43. The method of claim 42 further comprising configuring the selected configuration data update for communication to the image forming device including an embedded web server, and the communicating comprises communicating after the configuring.

44. The method of claim 42 wherein the communicating comprises communicating using HTTP communications.

45. The method of claim 42 further comprising identifying and communicating a suggestion message as a result of the receiving and wherein the suggestion message pertains to a type of usage of the image forming device as indicated by the usage data.

46. The method of claim 42 wherein the providing comprises providing the different configuration data updates comprising executable code updates.

47. The method of claim 42 wherein the providing, the receiving, the selecting and the communicating comprise using a remote device.

48. The method of claim 42 wherein the different configuration data updates control different printing of images upon paper according to the respective different configurations of the image forming device.

49. The method of claim 42 wherein the receiving comprises receiving the usage data within a remote device external of the image forming device and wherein the usage data is compiled by the image forming device.

50. The method of claim 42 wherein the selecting comprises selecting the one of the different configuration data updates that corresponds to a type of usage during the first period of time indicated by the usage data.

51. The method of claim 42 wherein the selecting comprises selecting the one of the configuration data updates which is configured to configure the image forming device to form hard images during a second period of time in accordance with usage of the image forming device to form the hard images during the first period of time as indicated by the usage data.

52. The method of claim 42 wherein the receiving comprises receiving the usage data from the image forming device.

53. The method of claim 42 wherein the selecting and the communicating comprise selecting and communicating in an absence of user input requesting the selecting or the communicating.

54. The method of claim 45 further comprising communicating the suggestion message to the image forming device.

55. The method of claim 50 wherein the selecting comprises selecting the one of the configuration data updates to configure the image forming device in accordance with the type of usage during the first period of time.

* * * * *